United States Patent [19]
Kawaguchi et al.

[11] Patent Number: 5,911,509
[45] Date of Patent: Jun. 15, 1999

[54] SLIDER FOR LINEAR GUIDE UNIT

[75] Inventors: Takahiro Kawaguchi; Tadashi Hirokawa, both of Tokyo, Japan

[73] Assignee: THK Co., Ltd., Tokyo, Japan

[21] Appl. No.: 09/043,585
[22] PCT Filed: Aug. 5, 1997
[86] PCT No.: PCT/JP97/02719
 § 371 Date: Mar. 27, 1998
 § 102(e) Date: Mar. 27, 1998
[87] PCT Pub. No.: WO98/05877
 PCT Pub. Date: Feb. 12, 1998

[30] Foreign Application Priority Data
 Aug. 6, 1996 [JP] Japan ..................... 8-206910

[51] Int. Cl.$^6$ ................................. F16C 29/06
[52] U.S. Cl. ............................................. 384/45
[58] Field of Search ..................... 384/43, 44, 45

[56] References Cited

U.S. PATENT DOCUMENTS 5,755,516  5/1998  Teramachi et al. ............... 384/45

FOREIGN PATENT DOCUMENTS 248433  9/1993  Japan .

*Primary Examiner*—Thomas R. Hannon
*Attorney, Agent, or Firm*—Nikaido, Marmelstein, Murray & Oram LLP

[57] ABSTRACT

The present invention concerns a slider of a rectilinear guide unit for guiding a movable body such as a work table of a machine tool, an industrial robot or the like by moving along a track rail arranged on a stationary section such as a bed or a column while bearing a load. Such type of slider is manufactured by injection-molding a synthetic resin over a metallic block main body having ball load rolling surfaces. Further, the block main body is provided on the outer side surfaces thereof with synthetic resin side surface molded portions with ball return holes formed by padding and on the front and rear end surfaces thereof with end surface molded portions with change direction paths for balls formed by padding. Further, simultaneously with the padding of the side surface molded portions and the end surface molded portions, there is formed by padding an upper surface molded portion on the upper surface of the block main body so as to connect the end surface molded portions formed on both end surfaces of the block main body, respectively.

2 Claims, 14 Drawing Sheets

Fig. 14
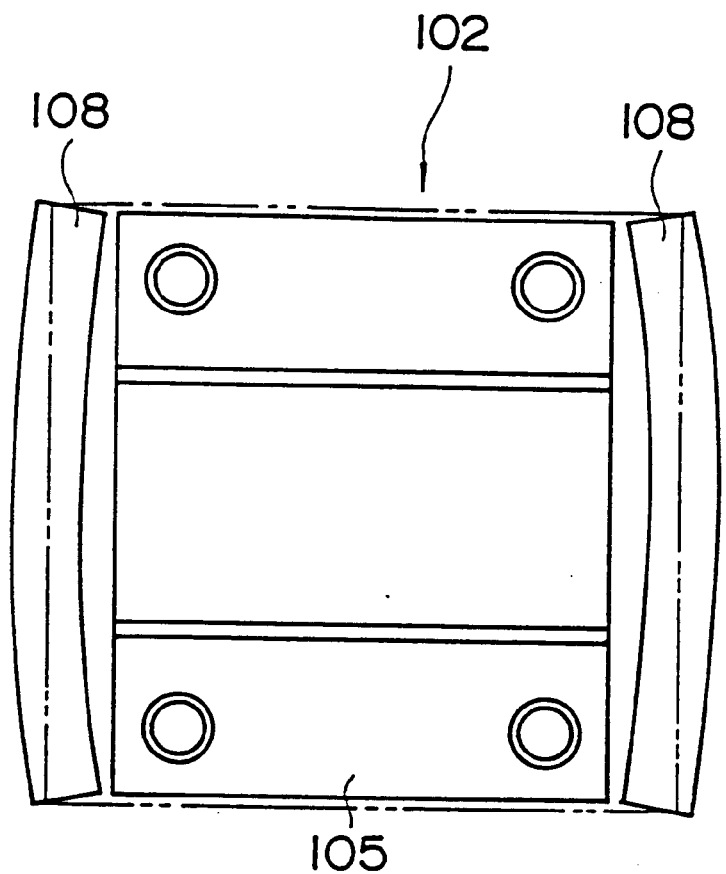
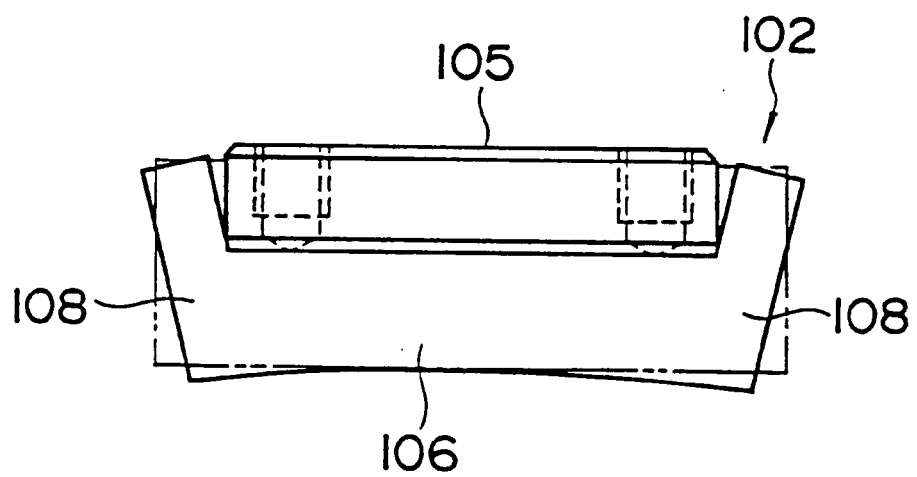

SLIDER FOR LINEAR GUIDE UNIT

TECHNICAL FIELD

The present invention relates to a slider of a rectilinear guide unit adapted to guide a movable body such as a work table of a machine tool, an industrial robot and etc. and more particularly to an improvement in a slider which is formed by padding a synthetic resin over a metallic block main body.

BACKGROUND TECHNOLOGY

Conventionally, as a rectilinear guide unit of the above type, there is known the one that has a structure comprising a track rail arranged on a stationary portion such as a bed and having ball rolling surface and a slider fastened to the track rail through a number of balls and movable along the rail while supporting a movable body such as a table.

Further, the slider comprises a movable block having ball load rolling surfaces opposing to the ball rolling surfaces of the track rail through the balls and ball return holes parallel to the ball load rolling surfaces and capable of moving along the track rail following the rolling of the balls and a pair of covers having change-direction paths for establishing communication between the ball load rolling surfaces and the ball return holes, and by fixing the covers to both front and rear end surfaces of the movable block, respectively, the load rolling surfaces and the ends of the ball return holes are respectively connected by the change direction paths thereby completing in the slider an endless circulation path for the balls.

In the case of the slider of the conventional rectilinear guide unit having the above-described structure, the process of drilling the ball return holes and the fixing of the ball retainers to the movable block becomes necessary resulting in taking much time and labor for its manufacture so that the present applicant provided such slider by making use of extrusion molding of a synthetic resin (refer to Unexamined Published Japanese Patent Application No. 7-317762).

FIG. 12 shows one example of a slider of a rectilinear guide unit manufactured according to the above-described method wherein the slider 101 fastened to a track rail 100 also comprises a movable block 102 and a pair of covers 103, 103 such that the movable block 102 comprises a metallic block main body 105 having load rolling surfaces 104 and padded with a synthetic resin by an injection-molding method and as shown in FIG. 13, ball return holes 107 corresponding to the load rolling surfaces 104 are formed in a pair of side surface molded portions 106 padded to the outer lower side surfaces of the block main body 105, respectively. Further, to simplify the shape of each of the covers 13, there are padded to the front and rear end surfaces of the block main body 105 a pair of end surface molded portions 108 which are continuous with the side surface molded portions 106, respectively, as shown in FIG. 14 and these molded portions 108 are provided with semicircular ball guide sections (not shown) for guiding the balls which have rolled the load rolling surfaces 104 to the ball return holes 107.

According to such slider manufacturing method making use of the injection molding of synthetic resin material, it is possible to manufacture in a simple manner the movable block 102 of a complicated shape by merely padding a synthetic resin over the block main body 105 and to continuously form the ball return holes 107 and the change direction paths through which unloaded balls roll with the advantage that the circulation of the balls is smoothed and the noise level at the time of rolling of the balls is reduced.

Now, due to the fact that the synthetic resin mold produced by injection-molding contracts in the direction of the large thickness portion thereof, when the side surface molded portions 106 are padded to the outer side surfaces of the block main body 105 so as to form the above-mentioned ball return holes 107 in the side surface molded portions 106, the portions 106 contract in the longitudinal direction thereof, that is, in a direction parallel to the ball return holes 107.

However, since both end surfaces of the block main body 105 are also provided with the synthetic resin end surface molded portions 108 padded by injection-molding and formed integral with the side surface molded portions 106 respectively, when the molded portions 106 contract for the above-described reason, the forces of such contraction of the molded portions 106 act unevenly upon the end surface molded portions 108.

Consequently, there has arisen a problem that as shown in FIG. 14, after a little while from the completion of injection-molding, the end surface molded portions 108 are pulled by the side surface molded portions 106 to become deformed and float up from the end surfaces of the block main body 105 so that gaps are formed between the block main body 105 and the end surface molded portions 108, respectively.

Further, there has also arisen a problem that although the covers 103 are respectively fixed to the end surface molded portions 108 to allow the slider 101 to have the change direction paths for the balls, when each of the end surface molded portions 18 deforms, the covers 103 can no more be fixed tightly to the end surface molded portions 108 failing to accurately form the change direction paths so that the balls rolled on the load rolling surface 104 can not be smoothly guided with respect to the ball return holes 107.

DISCLOSURE OF THE INVENTION

The present invention has been made in view of the above-described problems and an object of the present invention is to provide a slider of a rectilinear guide unit provided with ball return holes and change direction paths for balls formed by padding a synthetic resin to a metallic block main body, which slider is capable of preventing the deformation of the end surface molded portions padded onto the front and rear end surfaces of the block main body so that the change direction paths are formed accurately to thereby realize a smooth circulation of balls.

In order to achieve the above-described object, the present invention provides the following two types of sliders of a rectilinear guide unit.

That is, a first aspect of the present invention is characterized by the provision of a slider of a rectilinear guide unit, which comprises: a metallic block main body substantially in the shape of a saddle in section including a horizontal section and a pair of skirts drooping from the horizontal section and having ball load rolling surfaces on the inner surfaces thereof, respectively; synthetic resin side surface molded portions padded to the outer side surfaces of each of the pair of skirts of the block main body by injection molding and having ball return holes corresponding to the load rolling surfaces, respectively; and synthetic resin end surface molded portions padded to both longitudinal end surfaces of the block main body, respectively, by injection-molding so as to become continuous with the side surface molded portions, respectively, and having circular arc-shaped ball guide sections for guiding balls rolled on the load rolling surfaces to the ball return holes and operating such that it comes into engagement with a track rail through the balls rolling on the load rolling surfaces and moves along the track rail, wherein the block main body is provided on an upper surface of the horizontal section thereof with a synthetic resin upper molded portion which is injection-molded simultaneously with the side surface molded portions and the end surface molded portions and adapted to connect the end surface molded portions on both end surfaces of the block main body.

Further, a second aspect of the present invention is characterized by the provision of a slider of a rectilinear guide unit, which comprises: a metallic block main body substantially in the shape of the letter "L" including a horizontal section and a skirt drooping from one end of the horizontal section and having ball load rolling surfaces on the lower surface of the horizontal section and on the inner surface of the skirt, respectively; synthetic resin side surface molded portions padded to the top end of the horizontal section and the outer side surface of the skirt of the block main body by injection-molding and having ball return holes corresponding to the load rolling surfaces; and synthetic resin end surface molded portions padded to both longitudinal end surfaces of the block main body by injection-molding so as to become continuous with the side surface molded portions, respectively, and having circular arc-shaped ball guide sections adapted to guide the balls rolled on the load rolling surfaces to ball return holes, and operating such that it comes into engagement with a track rail through the balls rolling on the load rolling surfaces and moves along the track rail, wherein the block main body is provided on the upper surface of the horizontal section thereof with a synthetic resin upper molded portion which is injection-molded simultaneously with the side surface molded portions and the end surface molded portions and adapted to connect the end surface molded portions formed on both end surfaces of the block main body.

According to these technical means, even when the side surface molded portions forming the ball return holes contract and the force of such contraction acts on the end surface molded portions on both end surfaces of the block main body, since the upper surface molded portion is padded to the upper surface of the horizontal section of the block main body by injection-molding so as to connect the pair of end surface molded portions on both end surfaces of the block main body, the upper surface molded portion pulls the end surface molded portions against the force of contraction of the side surface molded portions so that the end surface molded portions are closely adhered to the end surfaces of the block main body without floating up from the latter.

BRIEF DESCRIPTION OF THE DRAWINGS

FIG. 14 is a plan view and a side view showing how end surface molded portions of a slider of the conventional rectilinear guide unit are deformed.

DESCRIPTION OF REFERENCE SYMBOLS

1: Track rail 2: Slider 40: Block main body 48: Side surface molded portion 49: End surface molded portion 50: Upper surface molded portion

BEST MODE FOR CARRYING OUT THE INVENTION

The slider of the linear guide unit according to the present invention will be described with reference to the accompanying drawings.

Figure 1:
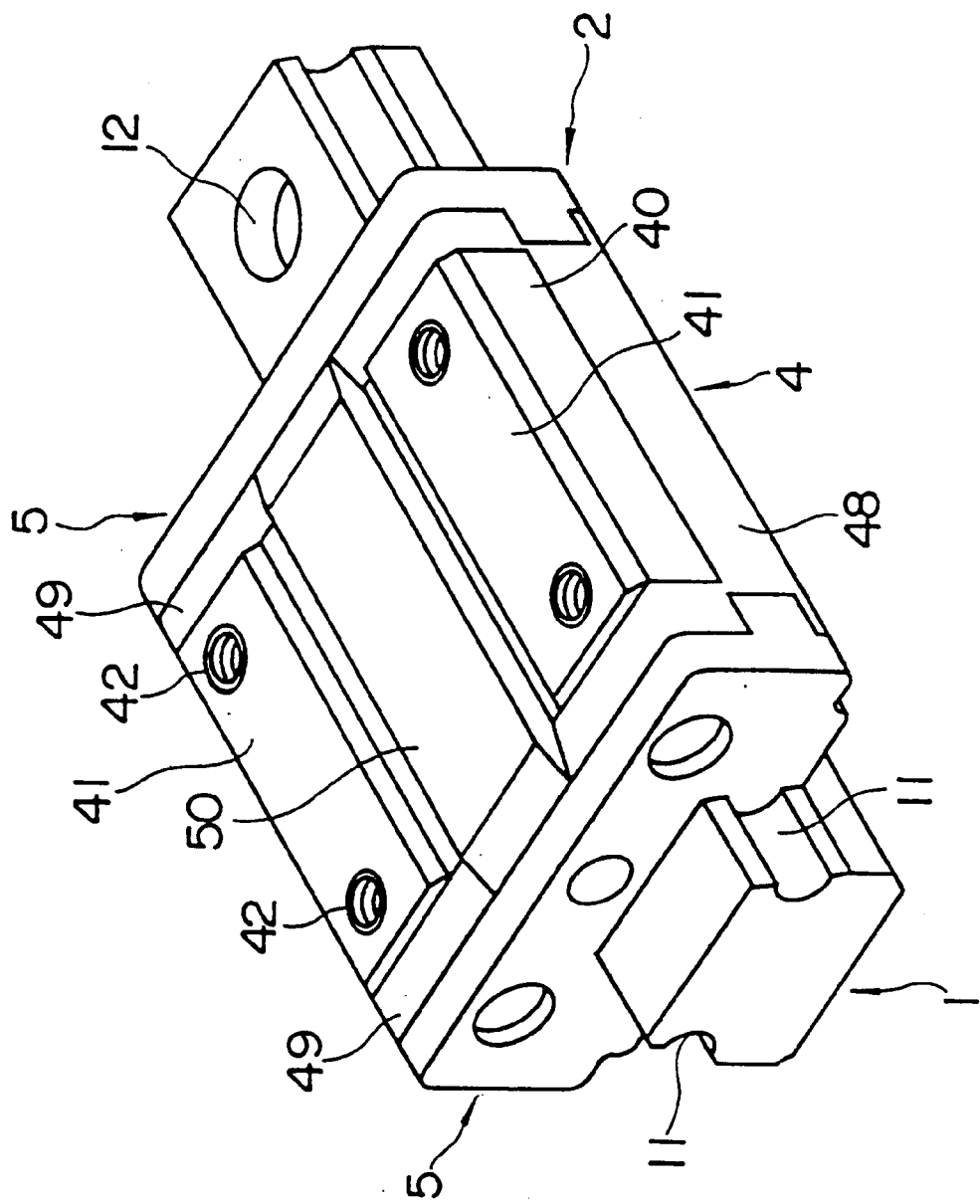
FIG. 1 is a perspective view of a linear guide unit with a slider according to a first embodiment of the present invention.
Figure 2:
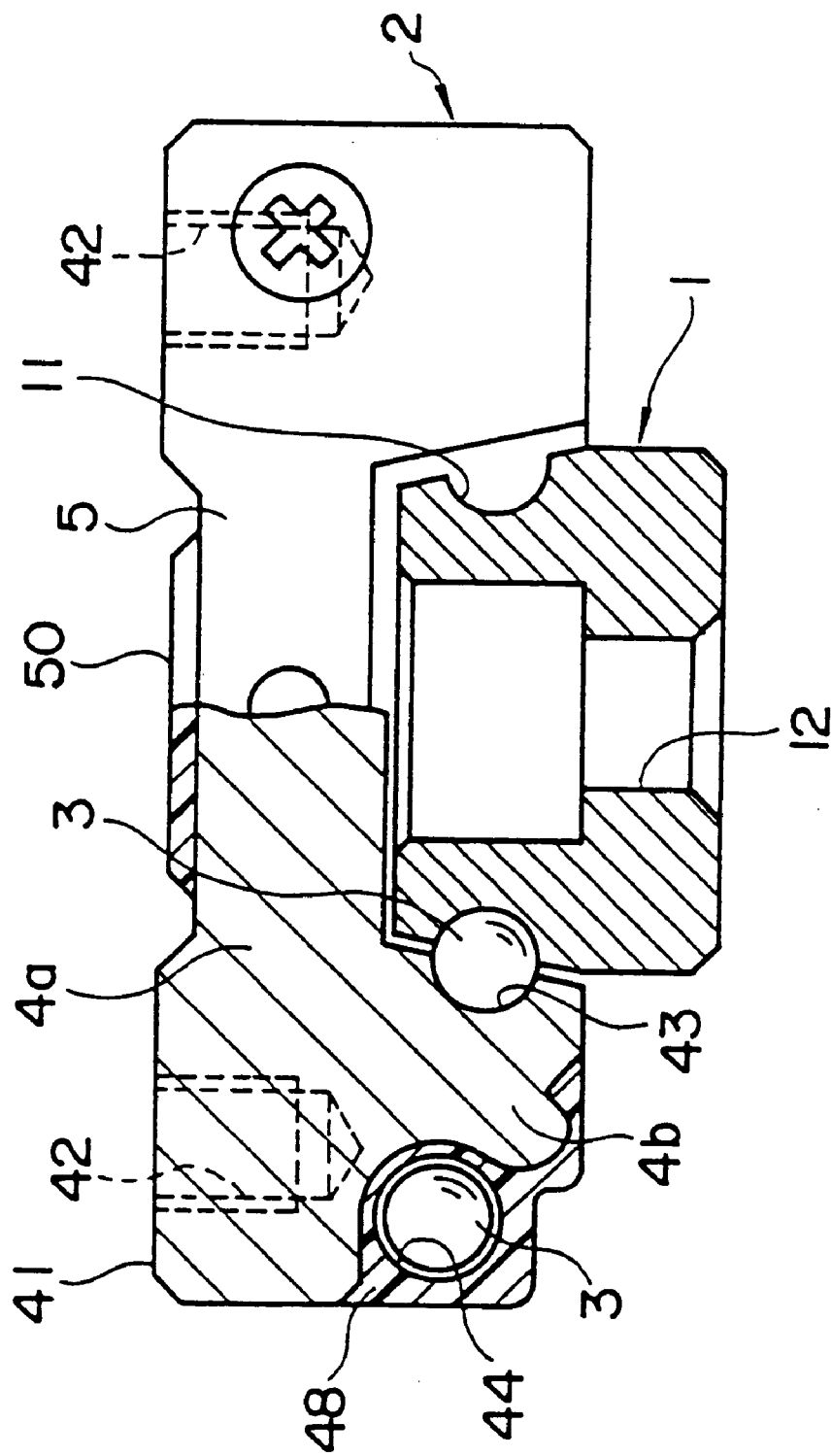
FIG. 2 is a front view (partly in section) of the linear guide unit shown in FIG. 1.

FIGS. 1 and 2 show a rectilinear guide unit comprising a combination of a slider and a track rail according to a first embodiment of the present invention.

In the figures, reference numeral 1 designates the track rail to be arranged in the stationary section such as a bed of a machine tool, reference numeral 2 designates a slider for guiding a movable body such as a table along the track rail 1 and reference numeral 3 designates balls which roll between the track rail 1 and the slider 2 while applying road on the rail and endlessly circulate in the slider 2.

First, the track rail 1 is substantially rectangular in section and on both side surfaces thereof there are formed two lines of ball rolling surfaces 11 for allowing the balls 3 to roll thereon along the longitudinal direction (vertical direction in FIG. 2). The track rail 1 is provided with bolt fitting holes 12 at suitable intervals in the longitudinal direction of the rail so that the track rail 1 is fixed to a stationary section by means of fixing bolts (not shown) to be inserted into the bolt fitting holes 12.

Further, the slider 2 comprises a movable block 4 having fitting surfaces 41 for a movable body such as a table and tapped holes 42 into which fixing bolts of the movable body are screw-fitted and a pair of covers 5, 5 to be fixed to the front and rear end surfaces of the movable block 4. Thus, by fixing the covers 5, 5 to the movable block 4, an endless circulation path for the balls 3 is formed within the slider.

The movable block 4 is substantially in the shape of a saddle in section and is provided with a horizontal section 4a on which the movable body fitting surface 41 is formed and a pair of skirts 4b, 4b drooping from the horizontal section 4a. On the inner surface of each of the skirts 4b there is formed a load rolling surface 4 opposing to the ball rolling surface 11 of the track rail 1. Further, each of the skirts 4b is provided with a ball return hole 44 corresponding to each of the load rolling surfaces 43 so that each of the balls 3 released from its load after having rolled on the load rolling surface 43 rolls in a direction reverse to the rolling direction of the balls on the load rolling surface 43.

Figure 3:
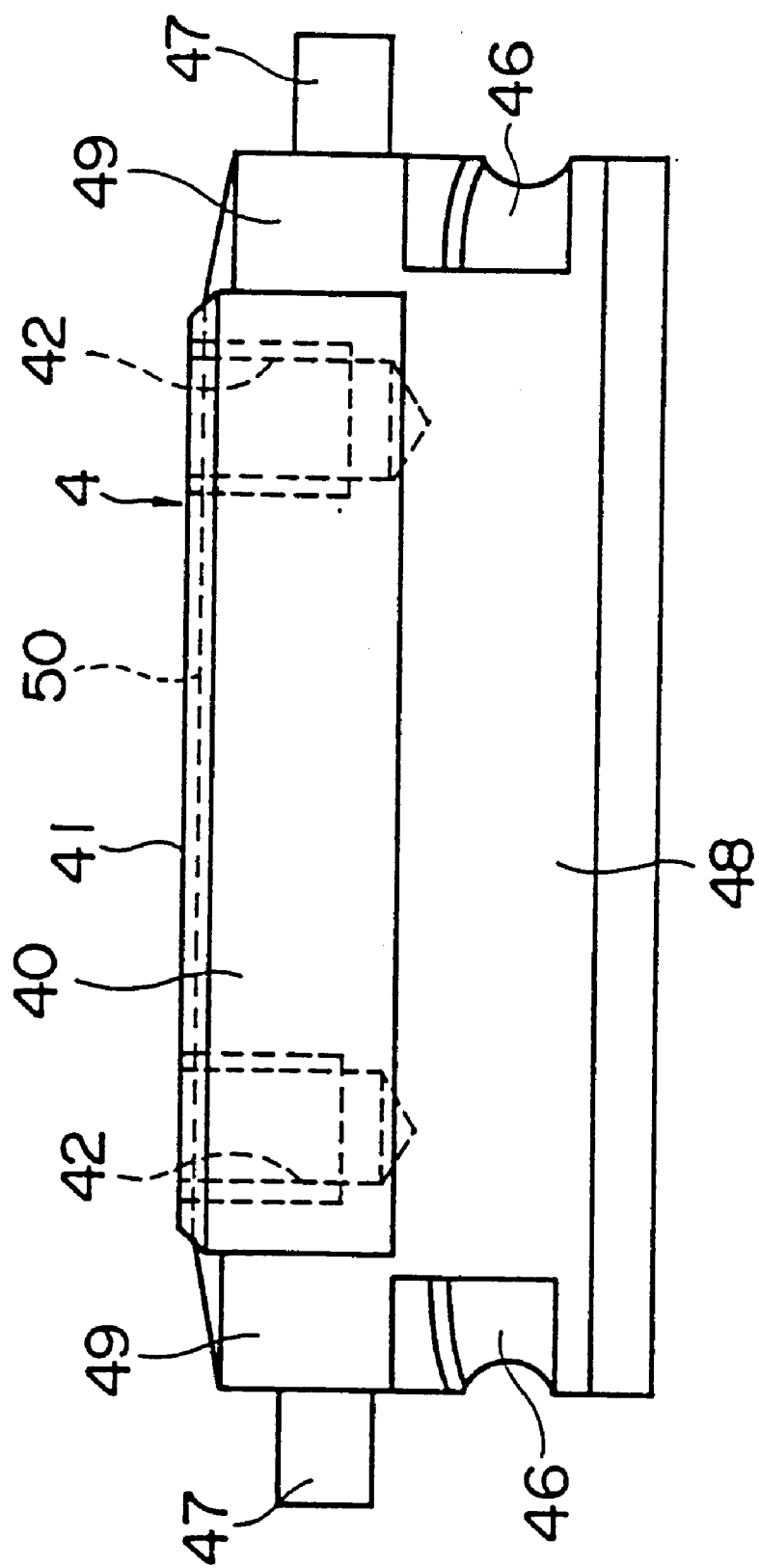
FIG. 3 is a side view of a movable block according to the first embodiment of the present invention.
Figure 4:
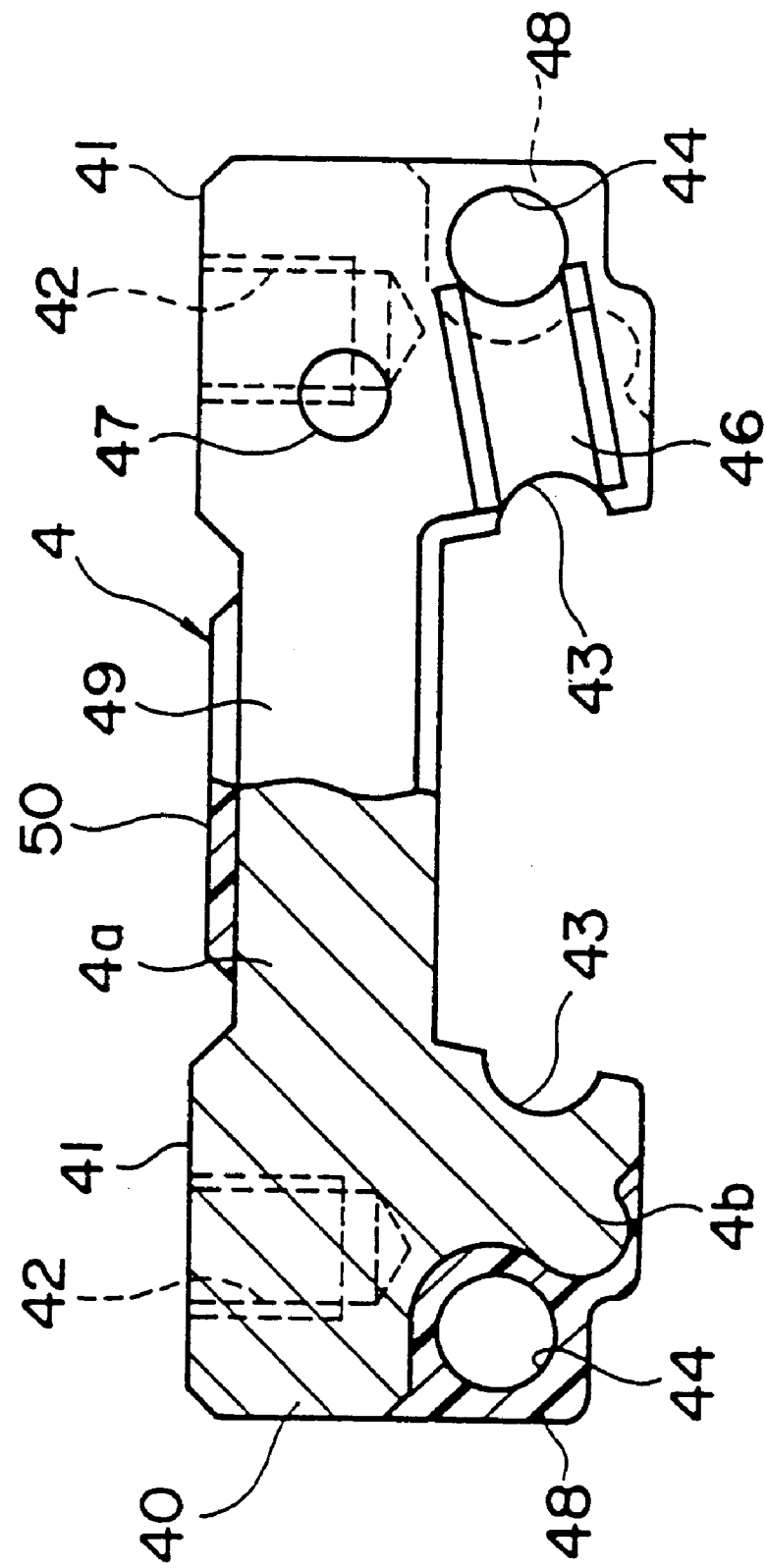
FIG. 4 is a front view (partly in section) of the movable block shown in FIG. 3.

On both front and rear end surfaces of the movable block 4 there are provided semicircular ball guide sections 46, respectively, as shown in FIGS. 3 and 4 so as to form change direction paths for the balls 3 together with U-shaped groove 51 of each of the covers 5 to be described later thereby guiding the balls 3 coming into, and leaving away from, the ball return holes 44. Further, on both front and rear end surfaces of the movable block 4 there are provided positioning bosses 7, respectively, for the covers 5.

Figure 5:
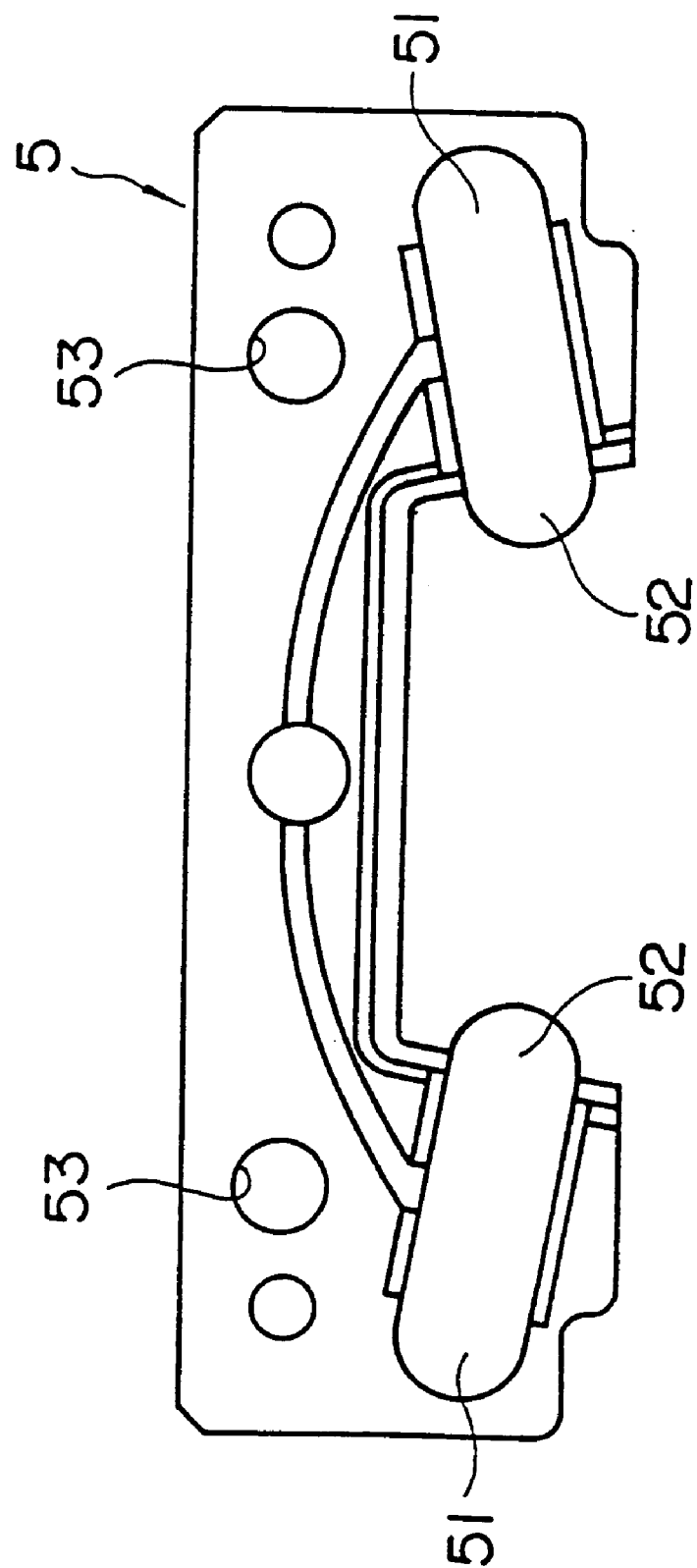
FIG. 5 is a rear view of a cover according to the first embodiment of the present invention.

FIG. 5 shows a contact surface of each of the cover 5 coming into contact with the movable block 4. This contact surface is provided with a pair of the above-mentioned U-shaped grooves 51 for forming the change direction paths for the balls 3 and each of the grooves 51 is provided at one end thereof with a projection 52 which scoops up each of the balls 3 which has rolled on the ball rolling surface 11 of the track rail 1. Further, the cover 5 has positioning holes 53 into which positioning bosses 47 of the movable block 4 are fitted, respectively.

Figure 6:
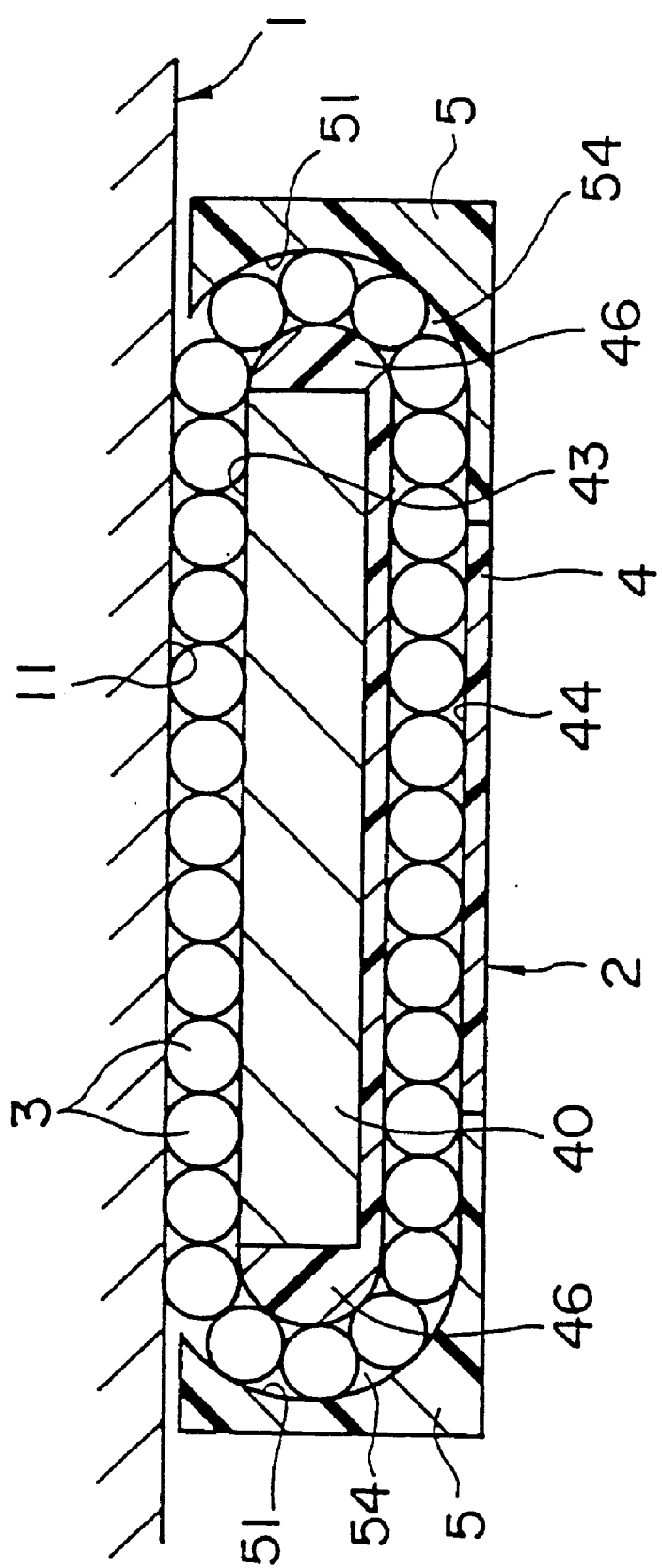
FIG. 6 is a sectional view of an endless ball circulation path attached to the slider of the linear guide unit according to the first embodiment of the present invention.
Figure 7:
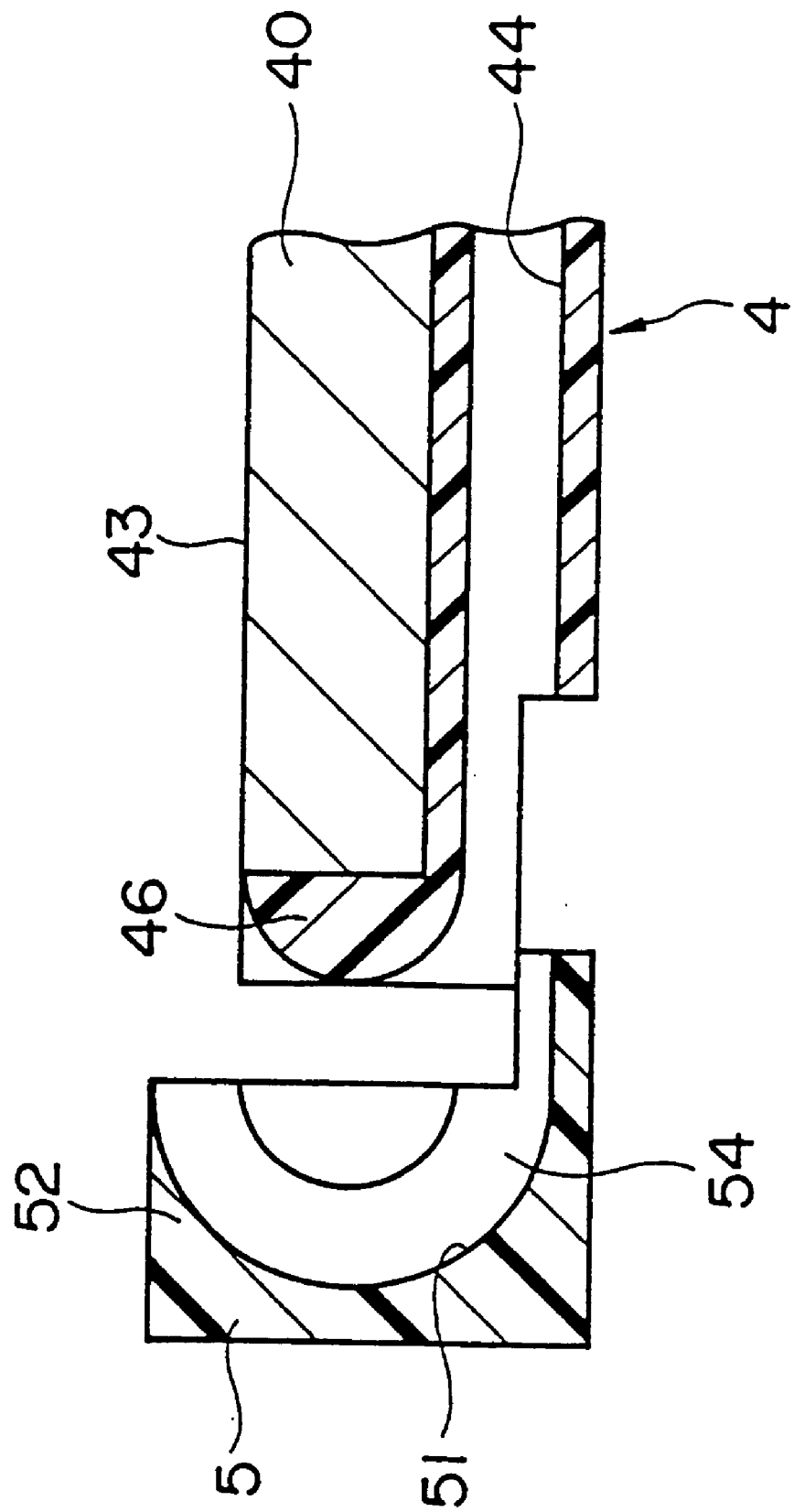
FIG. 7 is an exploded sectional view showing how the cover and the movable block are brought into engagement with each other.

FIG. 6 is a sectional view of an endless ball circulation path attached to the slider 2. As shown in FIG. 7, this endless circulation path is completed by fixing the covers 5 to both end surfaces of the movable block 4, respectively. That is, when each of the covers 5 is fixed to the movable block 4, the ball guide section 46 of the movable block 4 fits in the U-shaped groove 51 to thereby complete the U-shaped change direction path 54 and by this change direction path 54 the load rolling surface 43 of the movable block 4 and the above-mentioned ball return hole 44 are connected together.

With the above structure, when each of the balls 3 which has been bearing a load between the ball rolling surface 11 of the track rail 1 and the load rolling surface 43 of the movable block 4 has finished rolling on the load rolling surface 43 with the movement of the slider 2, it is released from its load to enter the change direction path 54 of one of the covers 5 and begins to roll through the ball return hole 44 of the movable block 4 toward a direction reverse to its rolling direction on the load rolling surface 43 under no load condition. Further, each of the balls 3 having finished rolling through the ball return hole 44 again enters between the track rail 1 and the movable block 4 through the change direction path 54 in the other cover 5 and rolls on the load rolling surface 43 as it bears a load.

In the linear guide unit according to the instant embodiment, the movable block 4 forming the slider 2 is manufactured by injection-molding a synthetic resin material. That is, the movable block 4 is so formed that a metallic block main body 40 produced by mechanical machining is padded with a synthetic resin by injection-molding in such a manner that the portions such as the above-mentioned movable body fixing surface 41 and the load rolling surface 43 for the balls 3 where a mechanical strength is required are formed on the block main body 40 while the portions such as the ball return holes 44, the ball guide holes 46 and positioning bosses 47 where not so great mechanical strength is required are formed of a synthetic resin material thereby making the weight of the movable block as small as possible.

Figure 8:
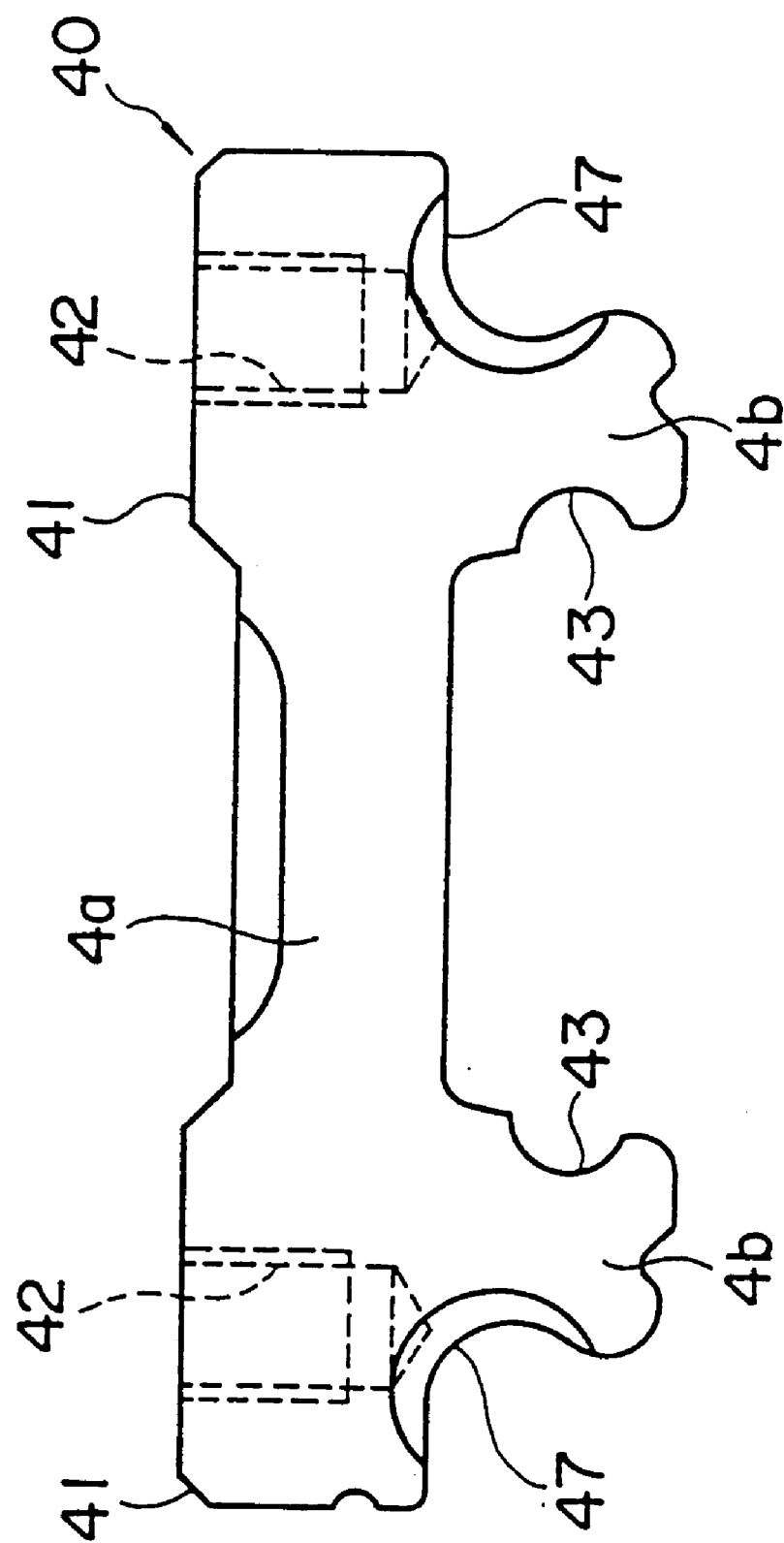
FIG. 8 is a front view of a block main body according to the first embodiment of the present invention.

FIG. 8 shows the block main body 40 before it is padded with the synthetic resin material. Such block main body 40 is first drawn to have a horizontal section 4a and a pair of skirt sections 4b, 4b and in this case, the outer side surface of each of the skirt sections 4b is formed to have a concave portion 47 for padding a synthetic resin thereto later. Further, the block main body 40 formed to its predetermined shape by drawing is ground whereby the above-mentioned movable body fitting surface 41 and the load rolling surface 43 are formed with a predetermined accuracy.

The block main body 40 finished to the predetermined shape is padded with a synthetic resin by injection-molding and in the case of such injection-molding, side surface molded portions 48 are padded to the concave portions 47 formed on the skirts 4b while end surface molded portions 49 are padded to the front and rear end surfaces of the block main body 40 so that the side surface molded portions 48 provide the above-mentioned ball return holes 44, respectively, while the end surface molded portions 49 provide the above-mentioned ball guide sections 46 and the positioning bosses 47, respectively.

On the other hand, where the amount of contraction of the synthetic resin after the completion of the injection-molding is taken into consideration, in the instant embodiment, the amount of contraction of each of the side surface molded portions 48 padded along the longitudinal direction of the block main body 40 is considered larger than that of each of the end surface molded portions 49 padded along the cross direction of the block main body 40 so that if the movable block 4 manufactured by the above-mentioned injection-molding is left as it is, there is a possibility that the end surface molded portions 49 are pulled by the side surface molded portions 48 to become deformed as shown in FIG. 14.

Therefore, in the instant embodiment, an upper surface molded portion 50 is padded between the pair of movable body fitting surfaces 41 simultaneously with the injection-molding of the above-mentioned end surface molded portions 49 and the side surface molded portions 48 so that the pair of end surface molded portions 49 located at both end surfaces of the block main body 40 are connected by the upper surface molded portion 50.

Consequently, the deformation of the end surface molded portions 49 is prevented by the upper surface molded portion 50 so that the end surface molded portions 49 can adhere to the block main body 40 without leaving any gaps therebetween thereby effectively preventing the aging of the movable block 4 manufactured by injection-molding. Further, since the deformation of the end surface molded portions 49 can be prevented, the covers 5 can be tightly fixed to the end surface molded portions 49, respectively, so that change direction paths 54 for the balls 3 which are completed by the fixation of the covers 5 thereto (refer to FIGS. 6 and 7) are accurately formed thereby achieving a smooth endless circulation of the balls.

Figure 9:
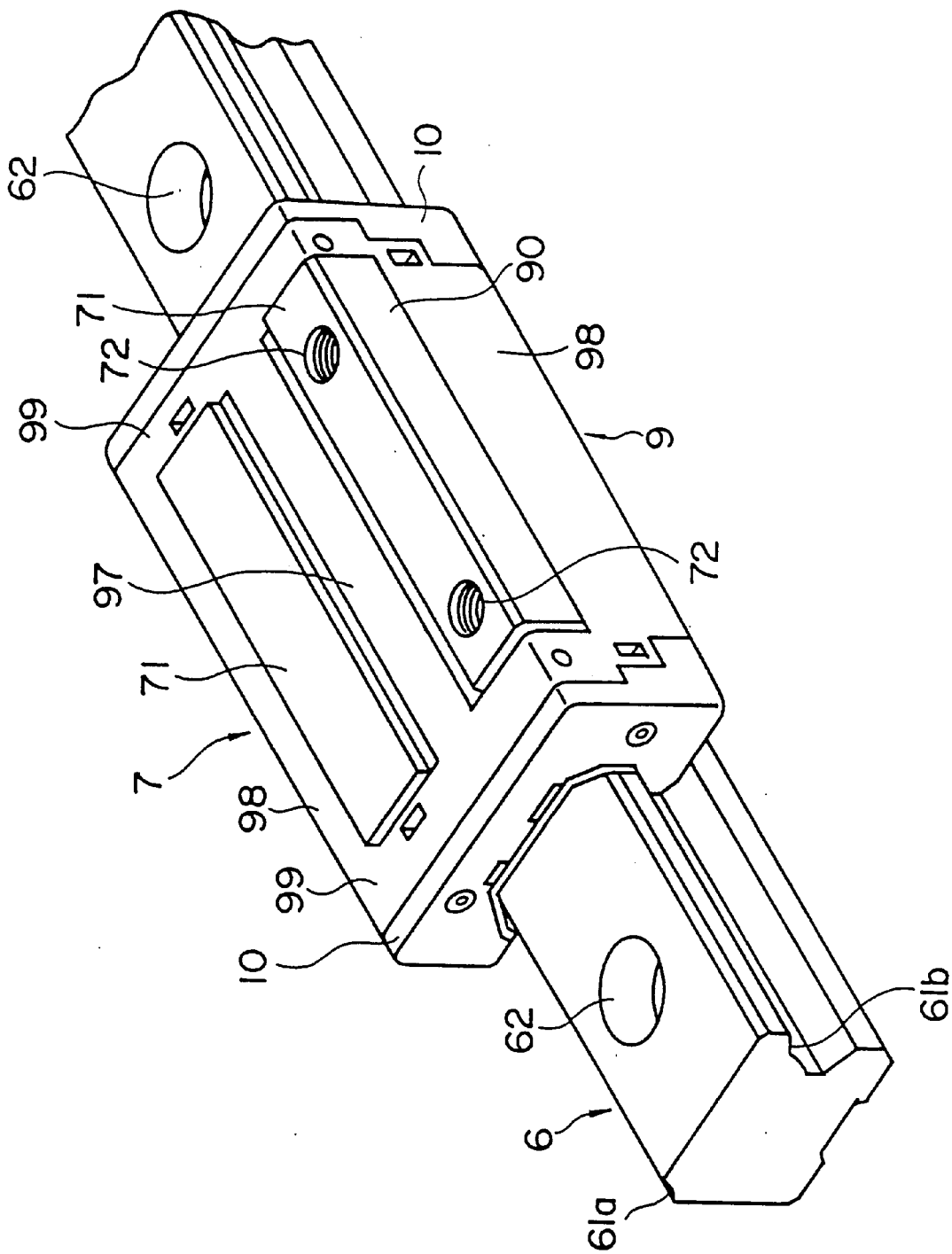
FIG. 9 is a perspective view of a linear guide unit according to a second embodiment of the present invention.
Figure 10:
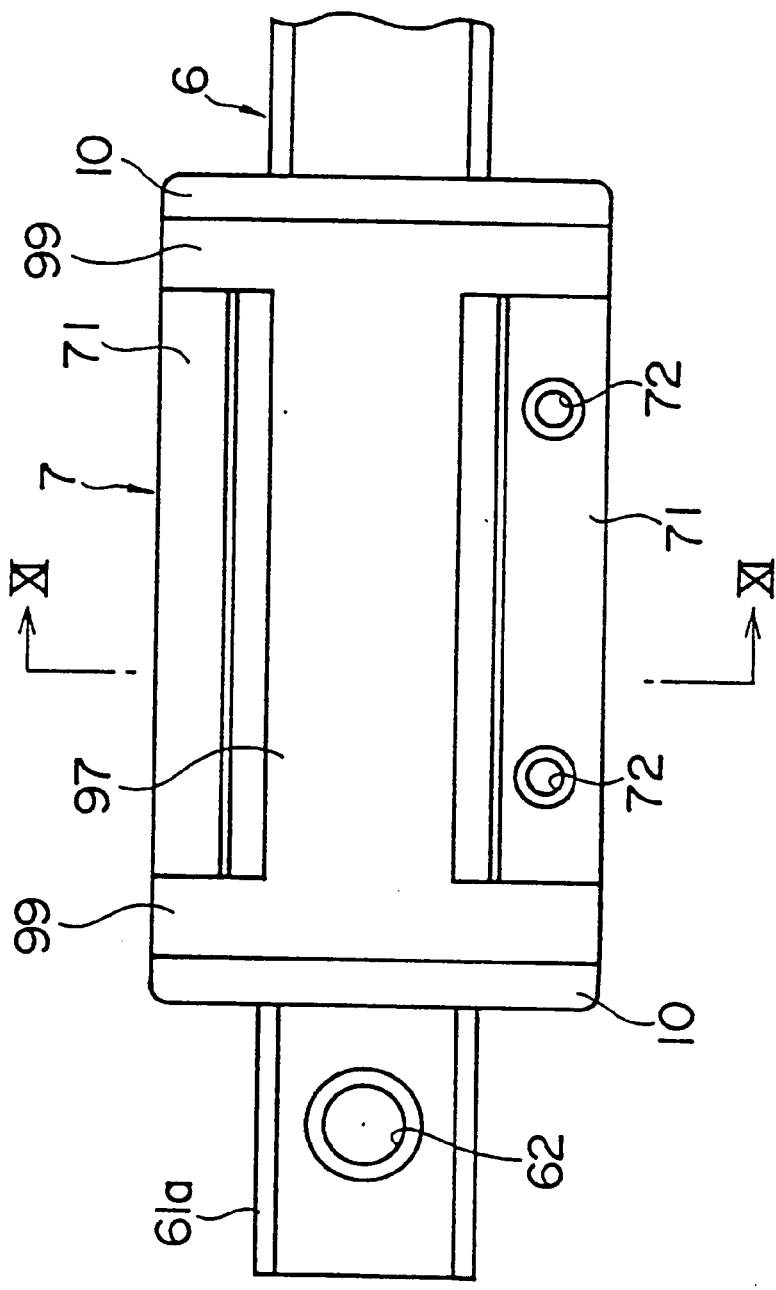
FIG. 10 is a plan view of the linear guide unit shown in FIG. 1.
Figure 11:
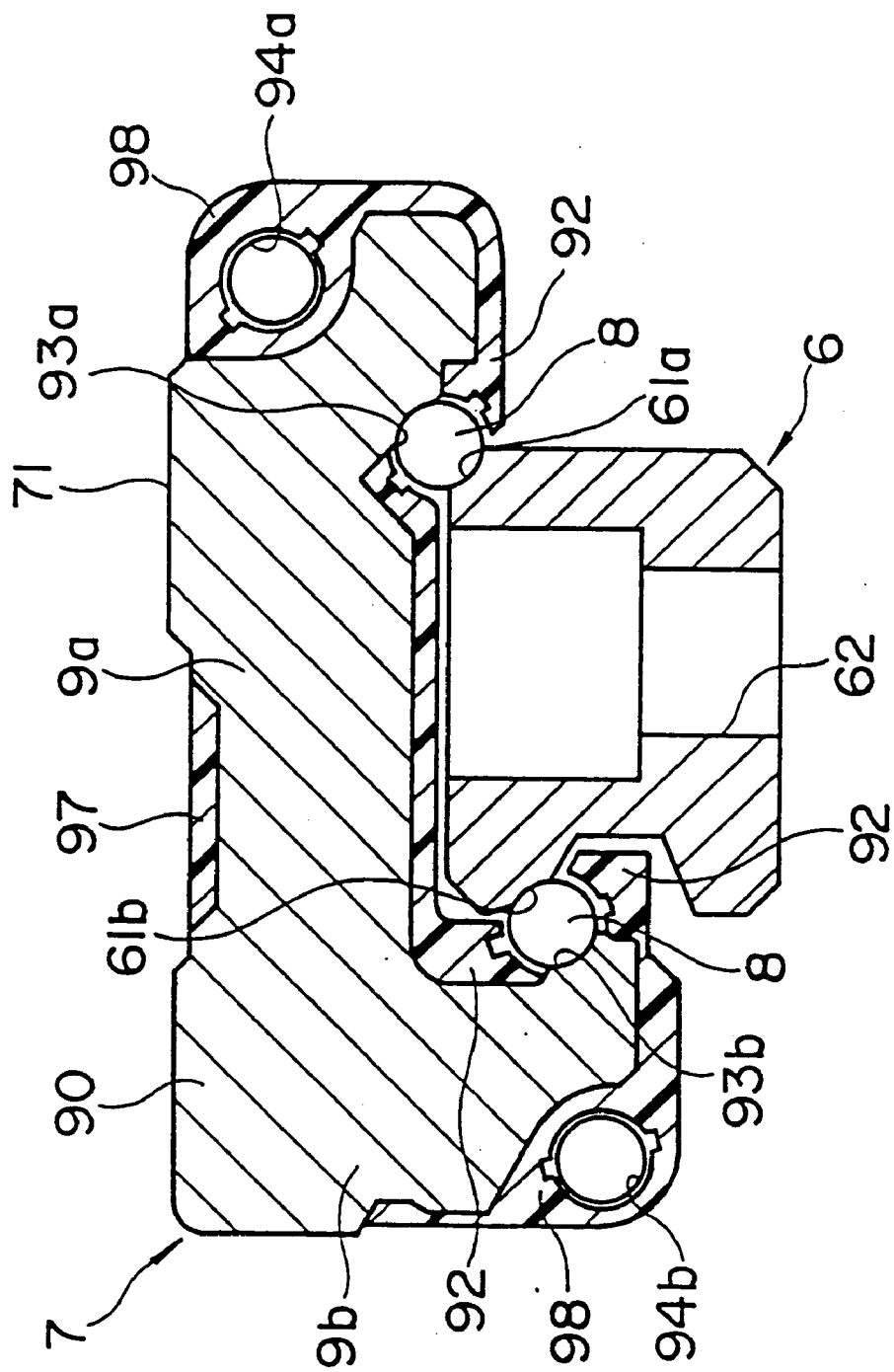
FIG. 11 is a sectional view taken along the XI—XI line of FIG. 10.
Figure 12:
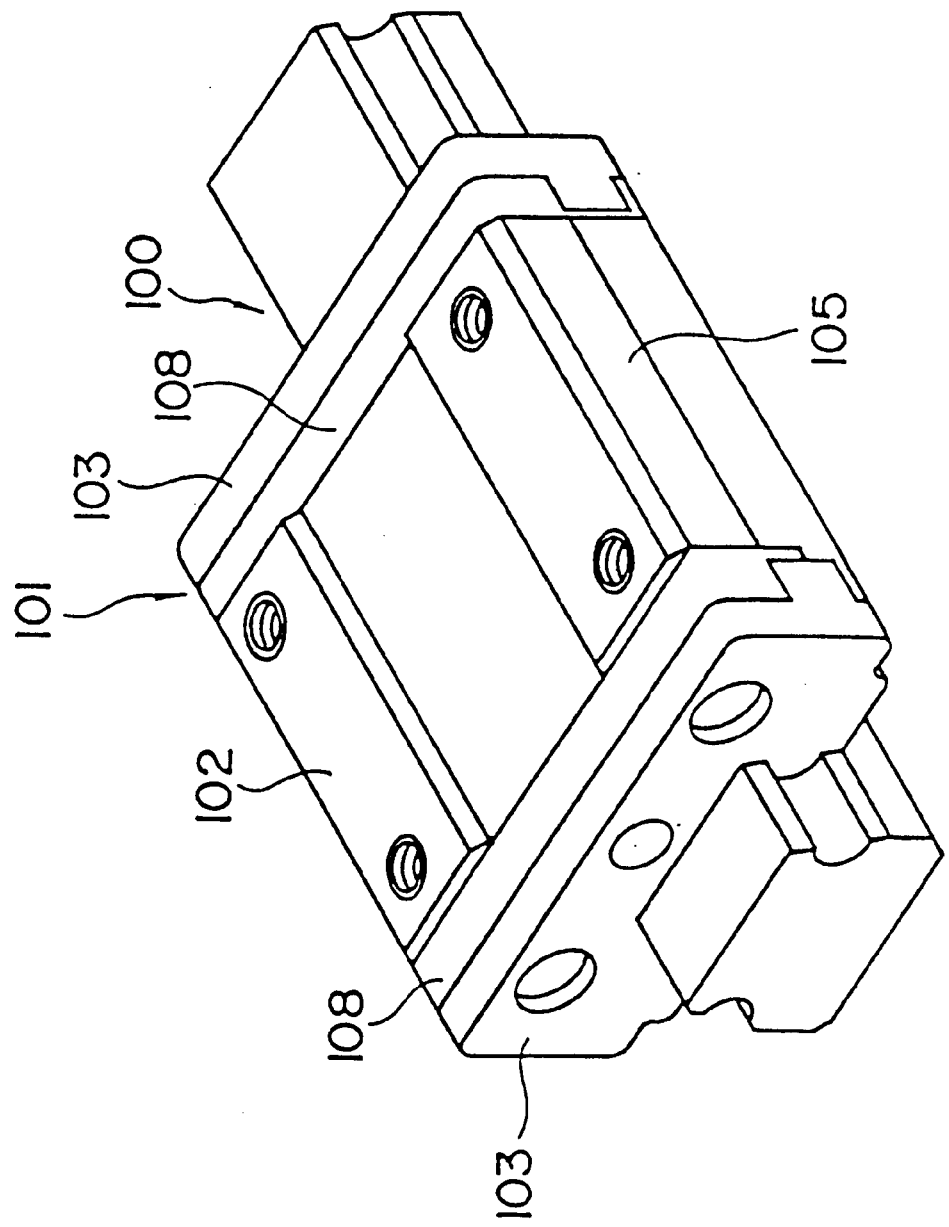
FIG. 12 is a perspective view of a conventional linear guide unit.
Figure 13:
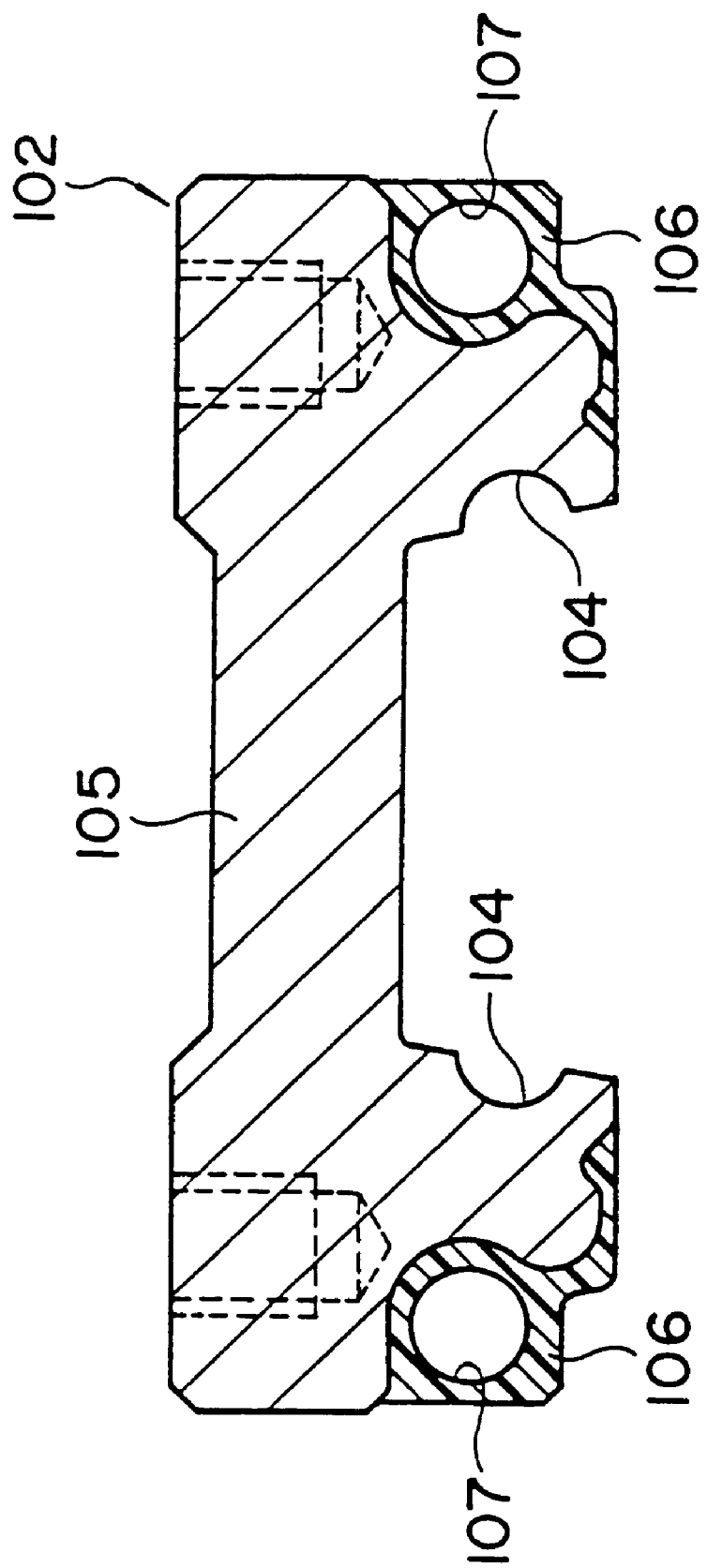
FIG. 13 is a sectional view of a slider of the conventional linear guide unit shown in FIG. 12.

Next, FIGS. 9 through 11 show a rectilinear guide unit according to a second embodiment of the present invention wherein a slider is combined with a track rail.

Like the above-described first embodiment, this rectilinear guide unit also comprises a track rail 6 and a slider 7 fastened to the track rail through balls 8 and adapted to guide a movable body along the track rail wherein the slider 7 comprises the movable block 9 having movable body fitting surfaces 71 and tapped holes 72 for receiving fitting bolts and a pair of covers 10 to be fixed to both front and rear end surfaces of the movable block 9, respectively.

Further, like the above-described first embodiment of the present invention, on both side surfaces of the track rail 6 there are formed two ball rolling surfaces 61a and 61b, respectively, of which the ball rolling surface 61a is formed to face upward at an angle of 45° (with respect to the horizontal direction) while the ball rolling surface 61b is formed to face downward at an angle of 12.5° (with respect to the horizontal direction). Further, the track rail 6 is provided with bolt fitting holes 62 in spaced apart relationships with one another in the longitudinal direction thereof so that it is fixed to a stationary section by fixing bolts (not shown) to be inserted into these bolt fitting holes 62.

The movable block 9 is substantially in the shape of L and comprises a horizontal section 9a provided with the above-mentioned movable body fitting surfaces 71 and a skirt 9b drooping from one end of the horizontal section 9a and into a concave portion formed by the horizontal section 9a and the skirt 9b, the upper half of the track rail 6 enters. On the side of the lower surface of the horizontal section 9a there is formed a load rolling surface 93a opposing to the upward facing ball rolling surface 61a of the track rail 6 and on the side of the inner surface of the skirt 9b there is a load rolling surface 93b opposing to the downward facing ball rolling surface 61b so that balls 8 supporting the slider 7 moving on the track rail 6 roll in the state of being sandwiched between the ball rolling surfaces 61a, 61b and the load rolling surfaces 93a, 93b.

Further, on both sides of the load rolling surfaces 93a and 93b of the movable block 9 there are formed retainers 92, respectively, so that when the slider 7 is removed from the track rail 6, the balls 8 on the load rolling surfaces 93a and 93b are prevented from falling down from the slider 7.

Further, the horizontal section 9a and the skirt 9b are provided with ball return holes 94a and 94b, respectively, in correspondence to the above-mentioned load rolling surfaces 93a and 93b so that the balls 8 released from their loads after having rolled on the load rolling surfaces 93a and 93b roll in a direction reverse to the direction of rolling thereof on the load rolling surfaces 93a and 93b.

Further, also in this embodiment, on the front and rear end surfaces of the movable block 9, there are provided semi-circular ball guide sections (not shown) for guiding the balls 8 from the load rolling surfaces 93a and 93b to the ball return holes 94a and 94b and by fixing the covers 10 to the movable block 9, an endless circulation path for the balls 9 is completed as in the case of the first embodiment.

Also in the case of the rectilinear guide unit according to this embodiment having the above-described structure, the movable block 9 forming the slider 7 comprises a metallic block main body 90 with a synthetic resin pad formed by injection-molding. The injection-molding is performed such that side surface molded portions 98 are padded to the top end of the horizontal section and the side surface of the skirt 9b of the block main body 90, respectively, with the formation of the above-mentioned ball return holes 94a and 94b and end surface molded portions 99 are padded to both front and rear end surfaces of the block main body 90, respectively, with the formation of the above-mentioned ball guide sections.

Also, in the case of the movable block 9 according to this embodiment thus manufactured, when the contraction of the side surface molded portions 98 and that of the end surface molded portions 99 are taken into consideration after completion of injection-molding, since there is a possibility that each of the end surface molded portions 99 is pulled by the contraction of each of the side surface molded portions 98 to become deformed with the generation of a gap between the two portions, the same countermeasure is taken as in the case of the first embodiment.

That is, an upper molded portion 97 is padded between the pair of movable body fitting surfaces on the upper surface of the block main body 90 simultaneously with the injection-molding of the end surface molded portions 99 and the side surface molded portions 98 so that the pair of end surface molded portions 99 of the block main body 90 are connected by this upper molded portion 97.

Consequently, also in the case of this embodiment, the upper surface molded portion 97 prevents the deformation of the end surface molded portions 99 so that the end surface molded portions 99 closely adhere to the block main body 90 without leaving any gap therebetween and since the end surface molded portions 99 are prevented from becoming deformed, it is possible to tightly fix the covers to these portions 99, respectively.

INDUSTRIAL AVAILABILITY

As described above, according to the slider of the rectilinear guide unit of the present invention, where the slider is manufactured by padding a synthetic resin to the metallic block main body, the upper molded portion is padded on the horizontal section of the block main body so as to connect the pair of end surface molded portions padded to both end surfaces of the block main body so that the end surface molded portions are prevented from becoming deformed after their padding and can be tightly adhered to the end surfaces of the block main body.

Further, even when the endless ball circulation path is formed by fixing the covers to the end surface molded portions, the deformation of the end surface molded portions is controlled according to the present invention so that it is possible to tightly fix the covers to the end surface molded portions, respectively, thereby achieving a smooth endless circulation of balls.

What is claimed is:

1. A slider of a rectilinear guide unit, which comprises: a metallic block main body substantially in the shape of a saddle in section including a horizontal section and a pair of skirts drooping from the horizontal section and having ball load rolling surfaces on the inner surfaces thereof, respectively; synthetic resin side surface molded portions padded to outer side surfaces of each of said pair of skirts of said block main body by injection-molding and having ball return holes corresponding to said load rolling surfaces, respectively; and synthetic resin end surface molded portions padded to both longitudinal end surfaces of said block main body, respectively, by injection molding so as to become continuous with said side surface molded portions, respectively, and having circular arc-shaped ball guide sections for guiding each of balls rolled said load rolling surfaces to said ball return holes and operating such that it comes into engagement with a track rail through the balls rolling on said load rolling surfaces and moves along said track rail, wherein said block main body is provided on the upper surface of the horizontal section thereof with a synthetic resin upper molded portion injection-molded simultaneously with said side surface molded portions and said end surface molded portions and adapted to connect said end surface molded portions formed on both end faces of said block main body.

2. A slider of a rectilinear guide unit, which comprises: a metallic block main body substantially in the shape of the letter "L" including a horizontal section and a skirt drooping from one end of the horizontal section and having ball load rolling surfaces on the lower surface of the horizontal section and on the inner surface of said skirt, respectively; synthetic resin side surface molded portions padded to the top end of said horizontal section and the outer side surface of the skirt of said block main body by injection-molding and having ball return holes corresponding to said ball load rolling surfaces; and synthetic resin end surface molded portions padded to both longitudinal end surfaces of said block main body by injection-molding so as to become continuous with said side surface molded portions, respectively, and having circular arc-shaped ball guide sections adapted to guide the balls rolled on the load rolling surfaces to ball return holes, and operating such that it comes into engagement with a track rail through the balls rolling on said load rolling surfaces and moves along said track rail, wherein the block main body is provided on the upper surface of said horizontal section thereof with a synthetic resin upper molded portion which is injection-molded simultaneously with said side surface molded portions and said end surface molded portions and adapted to connect said end surface molded portions respectively formed on both end surfaces of said block main body.

* * * * *

UNITED STATES PATENT AND TRADEMARK OFFICE
CERTIFICATE OF CORRECTION

PATENT NO.   :   5,911,509

DATED        :   June 15, 1999

INVENTOR(S)  :   Kawaguchi et al.

It is certified that error appears in the above-identified patent and that said Letters Patent is hereby corrected as shown below:

```
Item [54], delete "FOR" insert therefor -- OF --
```

Signed and Sealed this

Nineteenth Day of October, 1999

*Attest:*

Q. TODD DICKINSON

*Attesting Officer*          *Acting Commissioner of Patents and Trademarks*